United States Patent [19]

Jones et al.

[11] Patent Number: 4,664,222

[45] Date of Patent: May 12, 1987

[54] VIBRATOR BASEPLATE

[75] Inventors: Ernest L. Jones, Enid; Steven K. Bradford, Pond Creek, both of Okla.

[73] Assignee: George E. Failing Company, Inc., Enid, Okla.

[21] Appl. No.: 649,051

[22] Filed: Sep. 10, 1984

[51] Int. Cl.⁴ .................... G01V 1/02; G01V 1/047
[52] U.S. Cl. ................................. 181/113; 181/114; 181/121; 181/401; 367/189
[58] Field of Search ............... 181/111, 113, 114, 121, 181/142, 401, 403; 367/189, 190; 73/594, 662, 663, 664, 665, 667, 669, 672; 173/93, 103, 128, 130, 131

[56] References Cited

U.S. PATENT DOCUMENTS

| Re. 25,401 | 6/1963 | Clynch | 181/114 |
|---|---|---|---|
| 2,772,746 | 12/1956 | Merten | 181/114 |
| 2,910,134 | 10/1959 | Crawford et al. | 181/121 |
| 2,981,928 | 4/1961 | Crawford et al. | 367/56 |
| 3,152,658 | 10/1964 | Doty | 367/63 |
| 3,159,233 | 12/1964 | Clynch et al. | 181/114 |
| 3,174,142 | 3/1965 | Mallinckrodt | 364/823 |
| 3,208,545 | 9/1965 | Doty et al. | 367/190 |
| 3,209,322 | 9/1965 | Doty et al. | 367/63 |
| 3,273,113 | 9/1966 | Lerwill et al. | 367/41 |
| 3,280,935 | 10/1966 | Brown | 367/189 |
| 3,291,249 | 12/1966 | Bays | 181/114 |
| 3,306,391 | 2/1967 | Bays | 181/114 |
| 3,346,064 | 10/1967 | Hawkins | 181/114 X |
| 3,356,178 | 12/1967 | Nash, Jr. | 181/113 |
| 3,375,800 | 4/1968 | Cole et al. | 114/245 |
| 3,394,775 | 7/1968 | Cole et al. | 181/120 |
| 3,440,599 | 4/1969 | Waters et al. | 367/189 |
| 3,452,327 | 6/1969 | Clynch | 367/173 |
| 3,474,880 | 10/1969 | Gundlach | 181/114 |
| 3,482,646 | 12/1969 | Brown et al. | 181/120 |
| 3,550,719 | 12/1970 | Meister | 181/114 |
| 3,572,462 | 3/1971 | Gray | 181/401 X |
| 3,658,148 | 4/1972 | Clynch | 181/114 |
| 3,690,402 | 9/1972 | Stafford | 181/114 |
| 3,745,885 | 7/1973 | Fair et al. | 91/216 B |
| 3,779,335 | 12/1973 | Chelminski | 181/119 |
| 3,792,751 | 2/1974 | Fair | 367/140 |
| 3,866,709 | 2/1975 | Mifseed | 181/114 |
| 3,929,206 | 12/1975 | Bendenberger et al. | 181/114 |
| 4,020,919 | 5/1977 | Broding | 181/113 X |
| 4,116,299 | 9/1978 | Martin | 181/113 |
| 4,270,626 | 6/1981 | Prichett | 181/113 |
| 4,271,923 | 6/1981 | Layotte et al. | 181/114 |
| 4,291,780 | 9/1981 | Fulkerson | 181/114 X |
| 4,296,828 | 10/1981 | Layotte et al. | 181/121 |
| 4,341,282 | 7/1982 | Bird | 181/114 |
| 4,388,981 | 6/1983 | Fair | 181/119 |
| 4,492,285 | 1/1985 | Fair et al. | 367/189 |

OTHER PUBLICATIONS

Drawing No. 141F596-Baseplate-Geo. E. Failing Co., Mar. 19, 1971.
Drawing No. 158F255-Baseplate-Geo. E. Failing Co., Nov. 27, 1978.

Primary Examiner—Deborah L. Kyle
Assistant Examiner—Brian S. Steinberger
Attorney, Agent, or Firm—Litman, Day & McMahon

[57] ABSTRACT

A vibrator baseplate for use in a seismic signal transducer system has a bottom plate with a dome centrally located thereon. A pair of partial domes overlap the central dome on opposite sides thereof. Top plates are attached to the partial domes, which are also attached to the bottom plate. Internal rib stiffeners are provided within each dome and gusset members extend between the partial domes and the top plates. Means are provided to connect the baseplate to the seismic signal transducer system. Alternatively, the baseplate comprises a bottom plate with an elongate eccentric dome attached thereto.

2 Claims, 8 Drawing Figures

VIBRATOR BASEPLATE

BACKGROUND OF THE INVENTION

This invention relates to portable vibratory seismic signal transducers and particularly to an improved baseplate therefor.

Various methods of geophysical exploration have been developed to aid in the location of candidate sites for exploratory oil and gas drilling. Several surveying systems have been developed that utilize a plurality of vibratory energy sources to generate shock waves that are directed into the ground and reflected back to the surface by different geological layers. The time interval between the start and return of the energy wave can be used to determine the depth of the layer. At the surface, devices are used to record the reflected waves, and this data is processed to indicate drilling site candidates. Specifically, when plotted as a profile, the varying depths can show a trap that may contain oil. These systems typically generate the shock waves by using a reaction mass member that is actuated by a hydraulic system and electrically controlled by a servo valve. The force from the vibrating mass is transferred through a baseplate into the earth at a desired vibration frequency. The hydraulic system forces the reaction mass to reciprocate vertically, at the desired vibration frequency, through a short vertical stroke.

The small differences in time of the energy return require that the energy signals generated be exactly repeatable. Close mechanical and electronic tolerances must be maintained to achieve this repeatability. The baseplate must maintain contact with the ground during the vibration process to ensure repetition of nearly identical vibration frequencies. Not only will the seismic signal be distorted if ground contact is not maintained, but damage to the system may also result.

It has been discovered that it is desirable to minimize the mass of the structure in contact with the ground, i.e. the baseplate and associated support frames and hydraulic cylinders. Originally solid steel plates were used, but were found to be too heavy. Solid aluminum plates with internal honeycomb designs have been used also. The most common baseplate consists of a plurality of T bars or I-beams that are welded together at the flanges thereof. These structures were apparently introduced for the purpose of reducing the total weight of the baseplate structure, while increasing the overall strength of the structure.

The data gathering and correlating portion of the various seismic exploration systems have been improved to the point that problems have been discovered with the performance of existing baseplates. These problems are related to the fact that baseplates have resonant frequencies and they also vibrate, both of which produce distortions in the generated energy signal. These distortions are carried completely through the process and detrimentally affect the geological information produced thereby. One attempt to alleviate this problem has been the introduction of a baseplate having a single, circular dished head. This structure is believed to heighten the resonant frequency of the vibrator, while reducing the weight, and was developed by the assignee of the present invention.

Notwithstanding the advances of the prior art, there still exists a need for a lightweight, rigid baseplate with a relatively large surface contact area, and which does not detrimentally interfere with the geological information gathering procedure. The present invention provides such a baseplate having a rigid bottom plate with a central dome attached thereto. Overlapping lateral partial domes are attached to the baseplate on either side of the central dome. Internal rib stiffeners and upper gusset members are used to strengthen and stiffen the structure. Top plates are superposed over the partial domes and are attached to the gusset members. Appropriate means to connect the baseplate to the signal transducer system are included.

OBJECTS OF THE INVENTION

The principal objects of the present invention are: to provide a vibrator baseplate to be used with a seismic energy signal transducer system; to provide such a baseplate which is strong and rigid; to provide such a baseplate which tends to lessen distortions in the generated energy signal caused by the baseplate; to provide such a baseplate which reduces such distortions by lessening vibration of the baseplate and altering the resonant frequency thereof; to provide such a baseplate which increases the resonant frequency of the baseplate; to provide such a baseplate which is relatively light in weight for a given ground contact surface area; and to provide such a baseplate which is relatively easy to manufacture and maintain in working order, is durable in use and well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
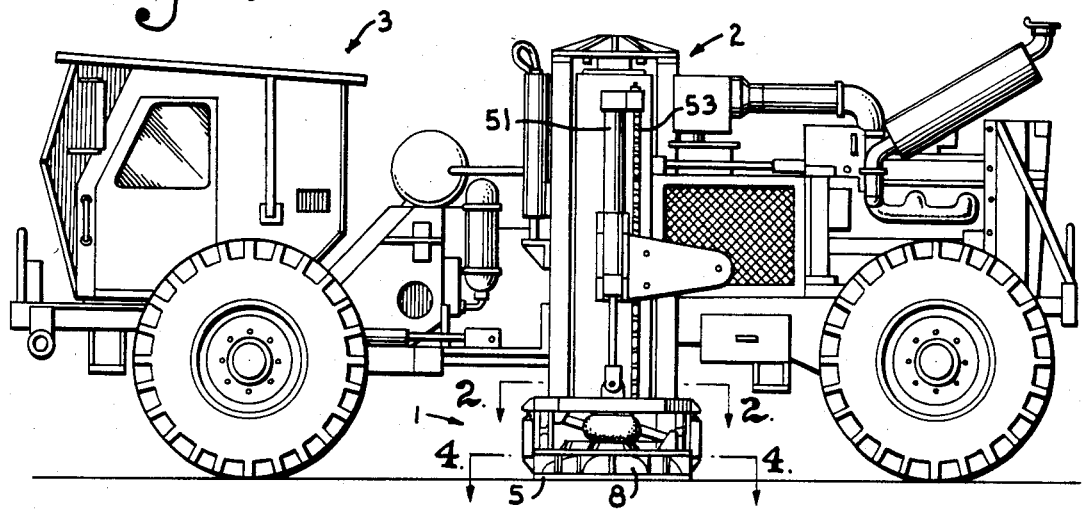
FIG. 1 is a side elevational view of an off-the-road buggy carrying a seismic signal energy transducer system including a vibrator baseplate embodying the present invention.
Figure 2:
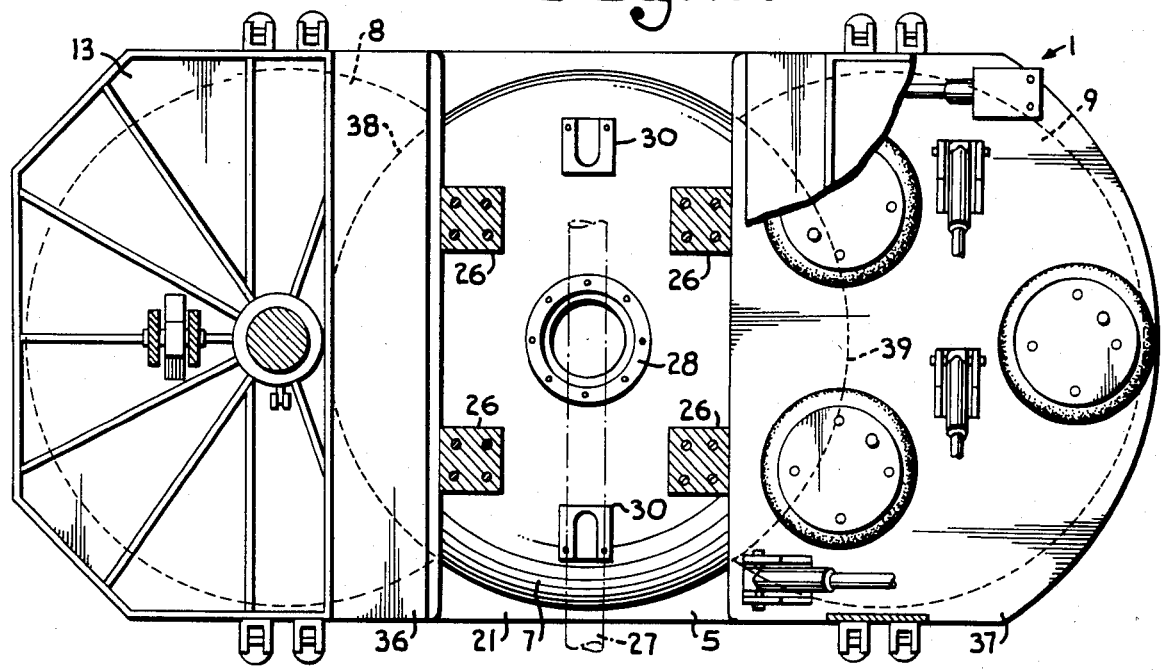
FIG. 2 is an enlarged, cross-sectional view of the baseplate taken along line 2—2, FIG. 1.
Figure 3:
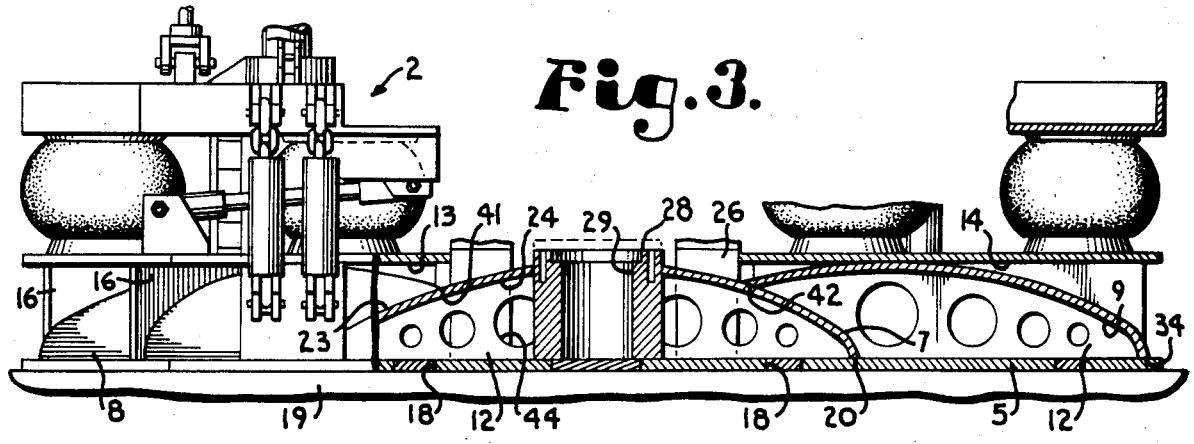
FIG. 3 is an enlarged, fragmentary end elevational view of the baseplate and surrounding environment, with portions broken away to show interior detail.

Referring more in detail to the drawings:

The reference numeral 1, FIG. 1, generally indicates a seismic vibrator baseplate of the present invention, shown in conjunction with a seismic energy signal transducer system 2 carried on a truck or the like, such as an off-the-road buggy 3. The baseplate 1 includes a rigid bottom plate 5 having a central or medial dome 7 attached thereto. A pair of first and second lateral domes 8 and 9 are also attached to the bottom plate 5, on either lateral side of the central dome 7, and overlap the central dome 7, as illustrated in FIGS. 2 and 3. A plurality of internal rib stiffeners 12 are positioned within the domes 7, 8 and 9 and attach the domes 7, 8 and 9 to the bottom plate for added strength. Top plates 13 and 14 are positioned over the first and second lateral domes 8 and 9, respectively, and are attached thereto. A plurality of upper gusset members 16 are situated between the first and second lateral domes 8 and 9 and the first and second top plates 13 and 14, respectively.

The transducer system 2 is of the type illustrated in U.S. Pat. No. 3,306,391, assigned to Conoco, Inc., which markets the system under the trademark VIBROSEIS. Other structures of the transducer system 2 are illustrated for purposes of placing the baseplate 1 in its proper environment; however, no claim is made to those aspects of the transducer system that are well known in the art. Particularly, certain aspects are taught by U.S. Pat. Nos. 3,690,402; 3,159,233; and others. The elements of the transducer system will be described only when necessary to properly disclose the instant invention. For those elements not specifically described, reference is made to the above-mentioned patents.

The bottom plate 5 is generally rectangular in shape with opposite sides that are semicircular. The bottom plate 5 is solid with the exception of a plurality of slots 18 that are cut into the bottom plate 5 so that the rib stiffeners 12 can be welded to the bottom plate 5. The bottom plate 5 is flat and is adapted to be placed in continuous contact with the ground 19 during operation of the transducer system 2, as seen in FIG. 3.

The central dome 7 is generally semispherical in shape, and is similar to a dished head that is commonly used on pressure tanks. The dome 7 has a circumferential edge 20 that is attached to a central portion 21 of the bottom plate 5, as by welding. An outer convex surface 23 and an inner concave surface 24 of the central dome 7 meet at the circumferential edge 20 thereof. The first and second lateral domes 8 and 9 also exhibit the outer and inner surfaces 23 and 24.

As illustrated, the central dome 7 is fabricated to accommodate different transducer system designs. A plurality of stilt pads 26 are provided for use with a stilt leg support structure as is well known in the art. The transducer system as illustrated in FIG. 1 illustrates such a stilt leg structure. The stilt leg structure is necessary when the transducer system is placed on a truck or buggy 3 that has a drive shaft and U-joint section 27 passing over the baseplate 1. The drive shaft and U-joint section 27 is shown in phantom lines in FIG. 2. If the drive shaft and U-joint section 27 does not pass over the central dome 7, a linear actuator shaft (not shown) is connected directly to support member 28 having a central bore 29 as shown in FIGS. 2 and 3. Tabs 30 are provided on the central dome 7 to accommodate a pair of synchronized cylinders (not shown) well known in the art.

Figure 4:
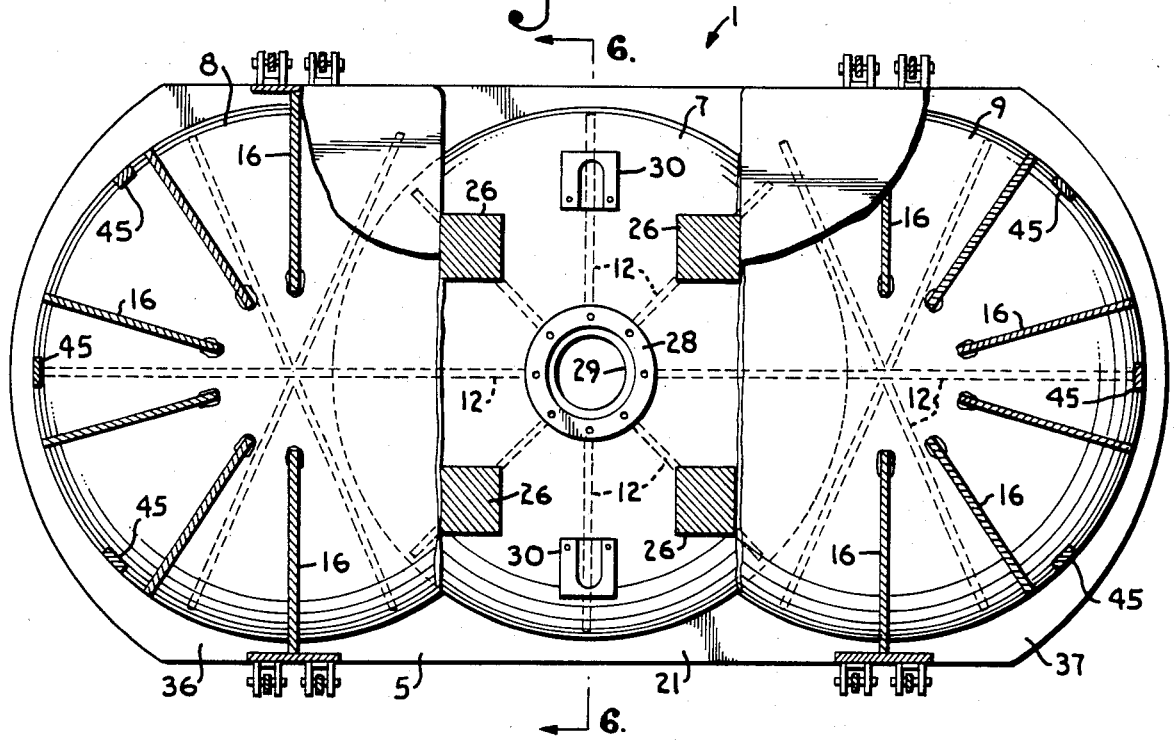
FIG. 4 is an enlarged, cross-sectional view taken along line 4—4, FIG. 1.
Figure 5:
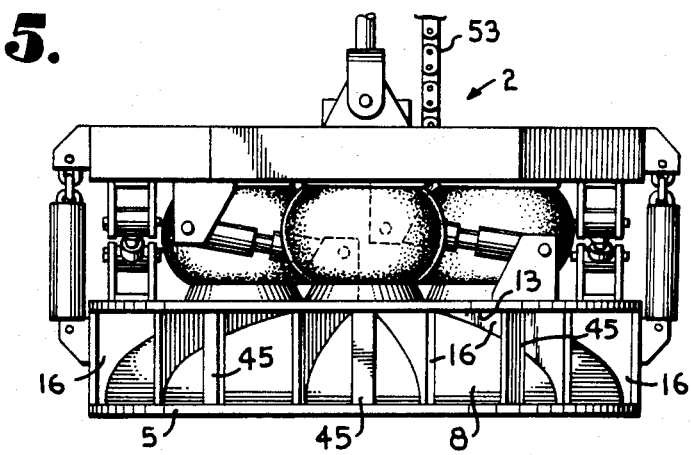
FIG. 5 is a fragmentary, enlarged side elevational view of the baseplate and surrounding environment.
Figure 6:
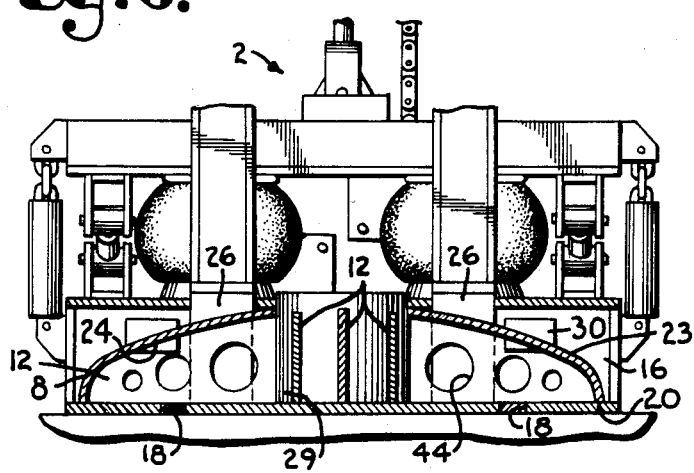
FIG. 6 is a cross-sectional view taken along line 6—6, FIG. 4.

The first and second lateral domes 8 and 9 are partial domes inasmuch as portions thereof are cut away so that they can be overlappingly attached to the central dome 7, FIG. 3. Each of the lateral domes 8 and 9 has a circumferential edge 34 that is attached to the bottom plate 5, as by welding. As seen in FIGS. 2 and 4, the first and second lateral domes are attached to first and second lateral portions 36 and 37 of the bottom plate 5 adjacent the bottom plate central portion 21. The lateral domes 8 and 9 have respective crescent-shaped indentations 38 and 39 therein. The indentations 38 and 39 have peripheral edges 41 and 42 that are illustrated in FIG. 3, the crescent-shaped indentations 38 and 39 are connected to the central dome 7 generally midway along the dome outer surface 23, and preferably form a symmetrical unit relative to both longitudinal and transverse center lines of the bottom plate 5.

As seen in FIG. 4, a plurality of the rib stiffeners 12 are located within the domes 7, 8 and 9. The stiffeners 12 are welded to the respective inner dome surfaces 24 and to the bottom plate 5. Each rib stiffener 12 has a plurality of apertures 44 therealong. The stiffener apertures 44 reduce the overall weight of the baseplate 1 while not affecting the strength of the stiffeners to an appreciable degree. For additional strength, the gusset members 16 are attached to the lateral dome outer surfaces 23 and to the top plates 13 and 14, as by welding. Additionally, a plurality of vertical support members 45 are included to further increase the overall strength of the baseplate 1.

Figure 7:
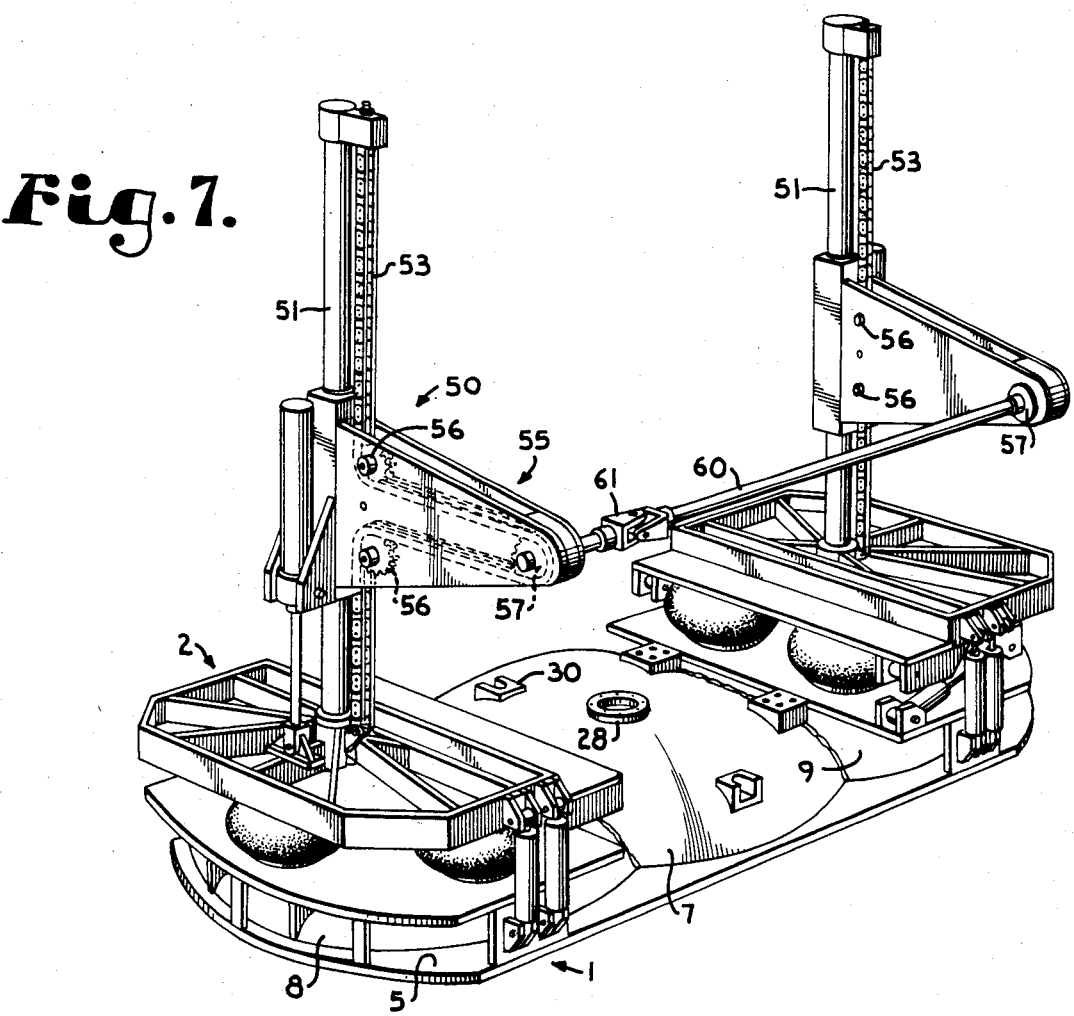
FIG. 7 is an enlarged perspective view of the baseplate and surrounding environment, including a chain synchronization lift unit.
Figure 8:
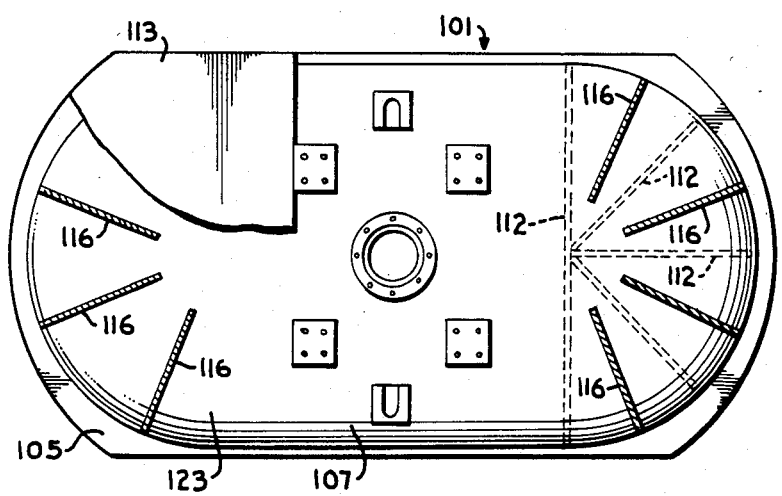
FIG. 8 is a fragmentary, top plan view of an alternate embodiment of the present invention, with portions broken away to show interior detail.

FIG. 7 illustrates a chain synchronization unit 50 that is provided to equalize the load carried by hydraulic lift cylinder arrangements 51. The unit 50 equalizes unequal forces that result from the baseplate 1 contacting uneven ground or other obstacles on the ground. The hydraulic lift cylinders 51 transfer a large portion of the weight of the truck 3 to the baseplate 1 during the exploration process, to ensure constant earth contact and to lessen vibration. If the baseplate 1 contacts uneven ground or other obstacles, one of the lift cylinders 51 will bear a disproportionate amount of the lifted weight, which may result in damage to the lift cylinders 51 or other transducer system structures. The synchronization unit 50 is provided to alleviate this problem.

Each lift cylinder 51 has a chain 53 associated therewith, which chain 53 extends from the top to the bottom of the lift cylinder 51 through a sprocket mechanism 55. The sprocket mechanism 55 comprises two idler sprockets 56 that are generally aligned with the lift cylinders 51. The sprockets 56 are idle and serve to journal the chains 53 to a respective working sprocket 57. The working sprockets 57 are located remote from the lift cylinders 51 and are connected by a shaft 60. The shaft 60 has a U-joint mechanism 61 therein for flexibility. As seen in FIG. 7, the chain 53 extends from the top of the lift cylinder 51 to an upper idler sprocket 56 and out to the working sprocket 57 before returning to the lower sprocket 56 and the bottom of the lift cylinder 51. As excess weight is carried by one of the hydraulic lift cylinders 51, the working sprocket 57 and shaft 60 serve to transfer an equalization force through same to the light load bearing hydraulic lift cylinder 51 to equalize the loads therebetween.

An alternative embodiment of the present invention is illustrated in FIG. 1, wherein a modified baseplate 101 is similar to the baseplate 1. The baseplate 101 includes appropriate structure to connect the baseplate 101 to a seismic energy signal transducer (not shown). The baseplate 101 includes a bottom plate 105 substantially similar to the baseplate 5. However, a dome 107 differs from the domes 7, 8 and 9 of the previous embodiment. As illustrated, the dome 107 has an eccentric shape, generally oval, although it is anticipated that the dome 107 can be elliptical in shape. A pair of top plates 113 are attached to an outer convex surface 123 of the oval dome 107. As in the previous embodiment, internal rib stiffeners 112 are attached to an inner surface of the dome 107 and to the baseplate 105 for added strength. Further, upper gusset members 116 are attached to the dome outer surface 123 and the top plates 113.

It is to be understood that while certain forms of the present invention have been illustrated and described herein, it is not to be limited to the specific forms or arrangement of parts described and shown.

What is claimed and desired to be secured by Letters Patent is as follows:

1. A vibrator baseplate for use in a seismic energy signal transducer system adapted to transmit a wave signal into the ground by imparting a vibratory force to a reaction mass member and transferring the force through said baseplate which is in contact with the ground, said baseplate comprising:
   (a) a bottom plate being adapted to be in continuous ground contact during operation of the transducer system;
   (b) a central dome being attached along a circumferential edge thereof to a central portion of said bottom plate; said dome exhibiting an outer convex surface and inner concave surface; said inner and outer surfaces being joined at said circumferential edge;
   (c) a first lateral dome being attached along a circumferential edge thereof to a first lateral portion of said bottom plate adjacent said bottom plate central portion and said central dome; said first lateral dome exhibiting an outer convex surface and an inner concave surface; said first lateral dome having a crescent-shaped indentation exhibiting a peripheral edge connected to said central dome outer surface; said peripheral edge corresponding to the contour of said central dome outer surface along the connection thereto;
   (d) a second lateral dome being attached along a circumferential edge thereof to a second lateral portion of said bottom plate adjacent said bottom plate central portion and said central dome; said second lateral dome exhibiting an outer convex surface and inner concave surface; said second lateral dome having a crescent-shaped indentation exhibiting a peripheral edge connected to said central dome outer surface; said peripheral edge corresponding to the contour of said central dome outer surface along the connection thereto; said first lateral dome, said central dome, and said second lateral dome being horizontally aligned along an axis extending longitudinally of said bottom plate;
   (e) first and second top plates each being superposed over and attached to said first and second lateral domes, respectively;
   (f) each of said central and first and second lateral domes having a plurality of rib stiffener members attached to respective inner surfaces thereof and to said bottom plate;
   (g) each of said first and second lateral domes having a plurality of gusset members attached to respective outer surfaces thereof and to said first and second top plates, respectively; and
   (h) means to connect said baseplate to the seismic energy signal transducer system.

2. A vibrator baseplate for use in a seismic energy signal transducer system, said baseplate comprising:
   (a) a bottom plate adapted to be in continuous ground contact during operation of the transducer system;
   (b) a central dome attached to a central section of said bottom plate; said dome exhibiting an outer convex surface;
   (c) a first lateral dome attached to a first lateral section of said bottom plate adjacent said bottom plate central section and said central dome; said first lateral dome having an indentation exhibiting a peripheral edge connected to said central dome outer surface, whereby said first lateral dome overlaps a portion of said central dome;
   (d) a second lateral dome attached to a second lateral section of said bottom plate adjacent said bottom plate central portion and said central dome; said second lateral dome having an indentation exhibiting a peripheral edge connected to said central dome outer surface, whereby said first lateral dome overlaps a portion of said central dome; said central dome and said first and second lateral domes being horizontally aligned along said bottom plate; and
   (e) means to connect said baseplate to the seismic energy signal transducer system.

* * * * *